Feb. 24, 1953 W. F. EAMES ET AL 2,629,847
MAGNETIC AMPLIFIER CIRCUITS FOR APPLYING REVERSIBLE DIRECT-CURRENT VOLTAGE TO INDUCTIVE LOADS
Filed Aug. 25, 1950
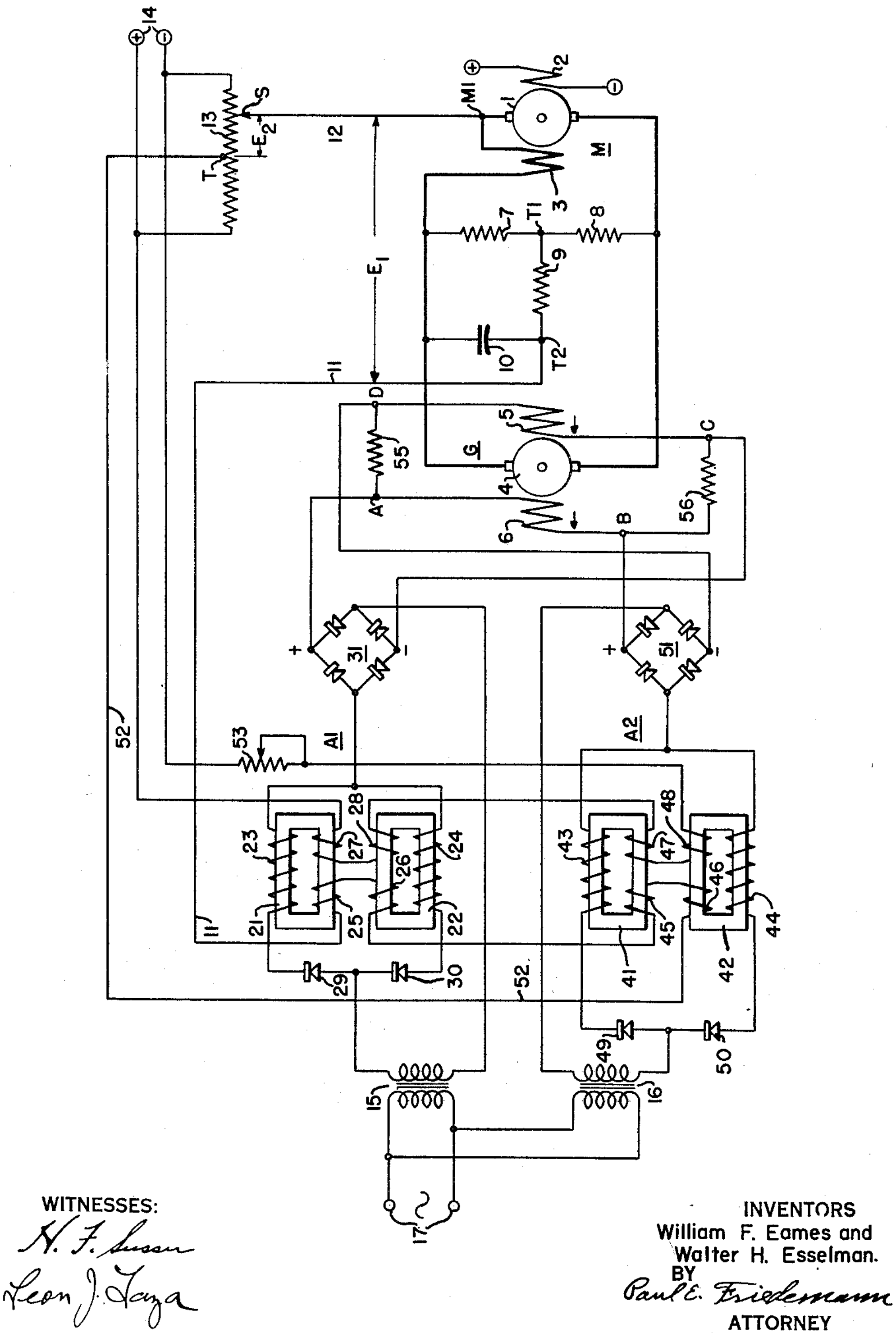
WITNESSES:
*N. F. Sussen*
*Leon J. Yaza*
INVENTORS
William F. Eames and
Walter H. Esselman.
BY
*Paul E. Friedemann*
ATTORNEY Patented Feb. 24, 1953 2,629,847

UNITED STATES PATENT OFFICE 2,629,847

MAGNETIC AMPLIFIER CIRCUITS FOR APPLYING REVERSIBLE DIRECT-CURRENT VOLTAGE TO INDUCTIVE LOADS

William F. Eames, Westfield, and Walter H. Esselman, Cranford, N. J., assignors to Westinghouse Electric Corporation, East Pittsburgh, Pa., a corporation of Pennsylvania Application August 25, 1950, Serial No. 181,548

13 Claims. (Cl. 318—146)

Our invention relates to magnetic amplifier circuits for energizing the field of a dynamo-electric machine or another inductive load by direct-current voltage which reverses its polarity with the direction of the control or input current of the amplifier. In a more specific aspect, our invention relates to motor speed regulators involving magnetic amplifiers.

A magnetic amplifier, being essentially an inductive type of regulator, tends to become unstable or lose control when subjected to the self-induced voltage and resulting current in an inductive load during the reversing performance. In the magnetic amplifier circuits now used, this tendency is overcome by putting up with two general disadvantages. In the known circuits, either (1) the load or field must be split into two opposingly poled parts which are separately energized and each rated for full excitation, or (2) the load is coupled with the amplifier through a resistance circuit so that only a small percentage of the amplifier output actually passes through the load. A circuit of the first type requires a larger space for the load, for instance, a larger dynamo-electric machine, because two full-size load or field windings must be accommodated instead of one. A circuit of the second type results in very poor efficiency and necessitates the use of larger magnetic amplifiers.

It is an object of our invention to provide reversible-output magnetic amplifier circuits for inductive direct-current loads that avoid or greatly minimize the above-mentioned disadvantages.

More particularly, it is an object of the invention to provide a reversible magnetic amplifier control for a machine field or the like inductive load that is capable of operating with field or load windings of normal space requirements and utilizes an amplifier of relatively small proportions, yet one which operates at a relatively high efficiency.

To this end, and in accordance with a feature of the invention, we split the field or load winding into two parts so that both together have the rating of a single normal winding, and we connect the two part windings in opposite branches of a bridge network whose other two branches contain resistors. We further provide a balanced magnetic amplifier with two amplifier units that are controlled in mutually inverse relation and have respective direct-current output circuits of inversely varying voltages of fixed respective polarities. We connect these output circuits to the respective pairs of bridge diagonal points, so that one output will excite the two load or field windings with one direction of excitation, and so that the second output will excite the field windings with the opposite direction of excitation. We have found that such a connection will not only provide an improved efficiency in the application of the control apparatus but also provides a reduction in the time required to reverse the excitation of the fields from full excitation in one direction, for example, to full excitation in the other direction over that required by conventional circuits used in the past. This shortened time constant is of great value in certain applications such as elevator control where a quick response is desired to changes in the speed control circuit.

These and more specific objects, features and advantages will be apparent from the following description in conjunction with the drawing showing schematically and by way of example the circuit diagram of a dynamo control system according to the invention suitable for the speed control of an elevator drive.

In the drawing, the motor to be controlled is denoted by M and its armature by 1. The motor has a separately excited field winding 2 attached to a suitable source of direct-current voltage, and is also equipped with a commutation pole winding 3. A low ohmic value resistor may be substituted for field winding 3, if the motor to be used does not have a commutating pole winding. Armature 1 and winding 3 are connected to the armature 4 of a generator G provided with two equal separately excited field windings 5 and 6 with a relatively large number of turns in each. This is the well known Ward Leonard connection.

A manually controlled potentiometer rheostat 13 is provided with a slider S and a center tap T. A voltage E2 will appear between S and T of negative proportions when slider S is moved to the right and positive proportions when slider S is moved to the left of tap T.

A second voltage source is provided by a fixed potentiometer comprising resistors 7 and 8 connected across the generator terminals. The voltage across points T1 and M1 is proportional to the speed of motor M. An antihunt voltage is produced in a resistor 9 by connecting a capacitor 10 and resistor 9 in shunt with resistor 7. Under steady state conditions capacitor 10 is charged to a voltage equal to that across resistor 7 and no current flows through resistor 9 to the capacitor but during speed changes a current will flow into or out of the capacitor and a voltage across resistor 9 will be found to be proportional to the first derivative of the speed.

When the voltage across resistor 9 is added algebraically to that across T1 and M1 a voltage E1 is obtained proportional to motor speed during steady state conditions and with a first derivative correcting or stabilizing factor added during speed changes.

Voltages E2 and E1 are mutually opposed. A difference in voltage will appear across the points T and T2 which is proportional to the difference in actual speed under steady state conditions and the desired speed as determined by the position of the movable slider S of rheostat 13. When the actual speed is correct, substantially zero voltage will appear between T2 and T.

It should be understood that other devices such as a tachometer generator may be used to provide a control voltage responsive to the motor speed or generally to the condition to be controlled by the field excitation of the generator G. As has been explained, the control voltage E1 is compared with a constant reference voltage E2 of a selectively adjusted magnitude which appears across a tapped-off portion of a potentiometric rheostat 13 connected across the terminals 14 of a suitable source of constant direct-current voltage. The polarity of the differential value of voltages E1 and E2 depends upon the direction in which the motor speed may depart from the desired value set by the selected adjustment of the control rheostat 13. This reversible difference voltage is applied to the controlling input circuit of a balanced magnetic amplifier which comprises two individual amplifier unit A1 and A2, and is energized through respective transformers 15 and 16 from alternating-current supply terminals 17.

Each amplifier unit is essentially a doubler circuit which provides a unidirectional output current whose magnitude depends upon that of the input signal. The amplifier unit A1 has two saturable reactors whose magnetizable cores are denoted by 21 and 22, respectively. Each core has a main winding 23 or 24, a control winding 25 or 26, and a bias winding 27 or 28. The main windings 23 and 24 are series connected with respective valves or half-wave rectifiers 29 and 30 so that they lie parallel to each other between the secondary winding of transformer 15 and the input terminals of a full-wave rectifier 31. The amplifier unit A2 is designed in the same way. Its individual elements denoted by 41 through 50 correspond to the above-described respective elements 21 through 30 of the unit A1. The main windings 43 and 44 with the appertaining valves 49 and 50 are connected in parallel relation to each other between the secondary winding of transformer 16 and the input terminals of a rectifier 51.

The control windings 25, 26, 45 and 46 are connected by a lead 52 with tap T of the speed control rheostat 13, and form part of the amplifier input circuit which is controlled by the differential value of the above-mentioned voltages E1 and E2. The poling of the control windings 25, 26, 45 and 46 is such that the amplifier units A1 and A2 are controlled to change their conductance in inverse relation to each other. That is, when the differential control voltage has a given polarity, the main windings 23 and 24 of the amplifier unit A1 have a low effective reactance during consecutive half-cycle periods of the alternating current while then the main windings 43 and 44 of unit A2 have a high effective reactance. Consequently, rectifier 31 then provides across its output terminals a relatively high voltage while the rectifier 51 provides a relatively low output voltage. When the differential control voltage reverses its polarity, the reactance conditions of the two amplifier units are also reversed, so that then the rectifier 31 has a low output voltage while the output voltage of rectifier 51 is high.

Two resistors 55 and 56 are series connected with the generator field windings 5 and 6 in a loop circuit so as to form a bridge network with four intermediate terminal points A, B, C and D. Preferably, the resistors 55 and 56 have equal resistance and the windings 5 and 6 have equal ampere turns and equal resistance. As a matter of fact, most favorable results are obtained if the resistance values of the field windings 5, 6 and of the resistors 55, 56 are all equal.

The bias windings 27, 28, 47 and 48 are connected through a calibrating rheostat 53 across the constant voltage terminals 14. These bias field windings are so poled and excited that at zero input from the control circuits the amplifiers each have zero output. If there appears an excitation of one direction which we may arbitrarily designate plus, then we may assume that amplifier A1 excites the field to run the motor in one direction. If the excitation is then reduced to zero the field in reduced to zero. If a minus excitation is then imposed the field excitation is obtained from amplifier A2 and is in the opposite sense and the motor runs in the opposite direction. While it may not be strictly true, the performance is in general effected so that when A1 is functioning A2 is idle and when A2 is functioning A1 is idle.

Let us assume that the motor speed is below the value adjusted for the rheostat 13 so that the differential value of voltages E1 and E2 has the polarity of the preponderant voltage E2. Then, for instance, the output voltage of rectifier 31 is higher than that of rectifier 51, and the two field windings 5 and 6 are traversed by currents flowing in the direction indicated by arrows. Both coils are cumulatively effective to excite the generator G in the sense needed to increase the voltage applied to the motor M, thus increasing the motor speed until, at the correct speed value, the difference between voltages E1 and E2 becomes just small enough to keep the amplifier output at the desired value. On the other hand, when the motor speed exceeds the correct value, the differential control voltage in the amplifier control or input circuit assumes the polarity of the voltage E1, with the effect that the generator field windings 5 and 6 are traversed by currents having the opposite direction, thus reducing the generator output voltage to the correct value.

During periods of change or reversal, the self-induced currents of the field windings 5 and 6 can expend their stored energy within the loop circuit through resistors 55 and 56 so that the stability of amplifier control performance is not affected. Due to the bridge circuit arrangement of the two field windings and the opposing excitation tending to reverse the field currents when the amplifier input changes polarity, the effect of the time constant of the amplifier circuit is minimized. In addition, the efficiency of the circuit is considerably improved over the known comparable circuits. Indeed, calculations and tests have shown that the load power obtained with an amplifier circuit according to the invention and as described above is about four times that of an amplifier circuit in which two resistors are connected in the known manner directly across the output terminals of the respective amplifier-energized rectifiers and in which the inductive load is connected across a series connection of these two resistors.

Various modifications of magnetic amplifiers concerning the design of the reactors as well as the appertaining rectifier circuit connections are known, and it is obvious to those skilled in the art that these known modifications and variations can readily be used in conjunction with the present invention without departing from the object and essence of the invention, and within the scope of the claims annexed hereto.

We claim as our invention:

1. In combination, a dynamo-electric machine having two control field windings, a magnetic amplifier having a variable-voltage input circuit and having a direct current output circuit of a variable voltage of one sense, a second magnetic amplifier having a variable-voltage input circuit and having a direct current output circuit of a variable voltage of an opposite sense, two resistors loop-connected with said windings in an alternate sequence, one winding and one resistor connected in parallel with the other resistor and the other winding being series connected in one of said output circuits, and the one winding and said other resistor connected in parallel with the one resistor and other winding being series connected in said other output circuit.

2. In combination, a generator having two cumulative field windings, a magnetic amplifier having a variable-voltage input circuit responsive to an operating condition controlled by said generator and having a direct current output circuit of a variable voltage of one sense, a second magnetic amplifier having a variable-voltage input circuit and having a direct current output circuit of a variable voltage of an opposite sense, two resistors loop-connected with said windings in an alternate sequence, one winding and one resistor connected in parallel with the other resistor and the other winding being series connected in one of said output circuits, and the one winding and said other resistor connected in parallel with the one resistor and other winding being series connected in said other output circuit, said windings and said resistors having substantially equal resistance values.

3. In combination, a balanced magnetic amplifier having a variable-voltage input circuit and having two pairs of direct-current output terminals, an inductive load having two windings of substantially equal number of turns and substantially equal resistance, two resistors of substantially equal resistance, said resistors and said windings being loop-connected with one another in an alternate sequence, one of said windings and one of said resistors being connected in series with each other across one pair of said terminals, and the said one of said resistors and the other of said windings being connected in series with each other across said other pair of terminals, and said terminals being poled relative to said windings for cumulative energization of said windings.

4. A magnetic amplifier circuit, for applying reversible direct current to an inductive load, comprising alternating-current supply means, an output-reversible magnetic amplifier having two amplifier units, said units having respective saturable reactor means with respective main windings and respective saturation control means, a variable-voltage control circuit, said saturation control means of said respective units being connected to said control circuit in mutually inverse control relation for simultaneous and inverse control of said respective reactor means, said units having respective rectifier means connected in series with said respective main windings across said supply means and having respective direct-current output terminals, an inductive load having two cumulative windings, two resistors loop-connected with said windings in an alternate sequence, one of said windings and one of said resistors being connected in series with each other across said terminal of one of said rectifier means, and one of said resistors and the other of said windings being connected in series with each other across said terminals of said other rectifier means.

5. In a speed regulator for a motor whose armature is supplied direct current excitation from a generator connected in the Ward Leonard manner, said generator having two field windings, the combination of, an adjustable pattern voltage source, a voltage source responsive to motor speed, a balanced saturable core reactor type magnetic amplifier having input windings and having two direct current output circuits each having a pair of terminals, a balanced Wheatstone bridge comprising two resistor arms and two arms containing said generator field windings, circuit connections for connecting the positive terminal of one pair of terminals to the junction between one field winding and one resistor and the negative terminal of said one pair of terminals to the junction between the second field and second resistor, and for connecting the positive terminal of the other pair of terminals to the junction between the first field winding and second resistor and the negative terminal of said second pair of terminals to the junction between the first resistor and second field winding, and differential connections between said adjustable pattern voltage source and said motor speed voltage source for energizing said amplifier input windings with the difference in voltage, whereby said motor speed is regulated to a value corresponding to the setting of said adjustable pattern voltage regardless of the load on said motor.

6. In a direct-current motor system having a motor and a generator with a common armature circuit and having two field windings on said generator, a motor speed regulator comprising an adjustable pattern voltage source, a voltage source responsive to motor speed, a balanced magnetic amplifier having a direct-current input circuit connected to said two sources and responsive to the difference of their respective voltages and having two direct current output circuits each having a pair of terminals, a balanced Wheatstone bridge circuit having two opposite resistance arms and having two remaining arms comprising said respective field windings, circuit connections for connecting the positive terminal of one pair of terminals to the junction between one field winding and one resistor and the negative terminal of said one pair of terminals to the junction between the second field and second resistor, and for connecting the positive terminal of the other pair of terminals to the junction between the first field winding and second resistor and the negative terminal of said second pair of terminals to the junction between the first resistor and second field winding, whereby the motor speed is regulated to a value depending upon said pattern voltage regardless of the load on said motor.

7. In a direct-current motor system having a motor and a generator with a common armature circuit and having two field windings on said generator, a motor speed regulator comprising an adjustable pattern voltage source, a voltage source responsive to motor speed, alternating-current supply terminals, a magnetic push-pull amplifier having two main windings and rectifier means connected to said current supply terminals and having respective direct-current output circuits connected with said rectifier means to provide respective output voltages opposingly controlled by said respective reactor devices, said reactor devices having respective control windings connected to said pattern voltage source and speed responsive voltage source and responsive to the voltage difference of said sources, a balanced Wheatstone bridge circuit having two opposite resistance arms and having two remaining arms comprising said respective field windings, said bridge circuit having two diagonally opposite points connected in one of said output circuits and having two remaining diagonally opposite points connected in said other output circuit, whereby the motor speed is regulated to a value depending upon said pattern voltage regardless of the load on said motor.

8. In a system of control, in combination, a dynamo-electric machine having two field windings, a pair of resistors, said resistors and field windings being loop-connected in alternate sequence, a magnetic amplifier having an output circuit having a first terminal and a second terminal, a second magnetic amplifier having an output circuit having a first terminal and a second terminal, control circuit means for said magnetic amplifiers for effecting a rise in voltage across the first and second terminals of the output circuit of the first magnetic amplifier and a decrease in voltage across the first and second terminals of the output circuit of the second magnetic amplifier upon a change of current of one sense in the control circuit means and for effecting an opposite action across the respective first and second terminals upon a change of current in an opposite sense in the control circuit means, and circuit connections for connecting the first and second terminals of the first output circuit, respectively, to the junctions of the first field winding and second resistor and the first resistor and the second field winding, and for connecting the first and second terminals of the second output circuit, respectively, to the junction of the first field winding and first resistor and the second field winding and the second resistor.

9. In a system of control, in combination, a dynamo-electric machine having two field windings, a self-saturating magnetic amplifier having an alternating current input circuit, a variable-voltage control circuit, and an output circuit having two terminals, a second magnetic amplifier having the same input circuit, including the same variable voltage control circuit, and having an output circuit having two terminals, the variable voltage control circuit being so wound with reference to the second magnetic amplifier that for a voltage variation of one sense the saturation of the first magnetic amplifier increases from a given saturation and the saturation of the second magnetic amplifier decreases from a given saturation, a pair of resistors, said resistors being loop-connected with said field windings in alternate sequence, and circuit means for connecting the first terminal of the first output circuit to the junction of the first field winding and the second resistor and the second terminal of the first output circuit to the junction of the first resistor and second field winding and for connecting the first terminal of the second output circuit to the junction of the first field winding and the first resistor and the second terminal of the second output circuit to the junction of the first field winding and the first resistor and the second terminal of the second output circuit to the junction of the second field winding and the second resistor.

10. In combination, a magnetic amplifier having a variable-voltage input circuit and having an output circuit having two direct current output terminals, a second magnetic amplifier having a variable-voltage input circuit and having an output circuit having two direct current output terminals, an inductive load having two cumulative windings, two resistors, said two windings and two resistors being connected in a loop circuit in alternate sequence, the positive terminal of the first output circuit being connected to the junction of the first winding and second resistor and the negative terminal being connected to the junction of the first resistor and second winding, and the positive terminal of the second output circuit being connected to the junction of the first winding and first resistor and the negative terminal being connected to the junction of the second resistor and second winding.

11. In an electric system of control, in combination, saturable core reactor means having variable voltage input means the voltage input of which may be varied from a given positive value to a given negative value, said saturable core reactor means having output circuit means including a first positive terminal, a first negative terminal, a second positive terminal, and a second negative terminal, an electric load unit comprising a first inductive device, a first resistor, a second inductive device, and a second resistor all connected in a loop circuit in the order recited, circuit means for connecting the first positive terminal to the junction between the first inductive device and the second resistor and the first negative terminal to the junction between the first resistor and the second inductive device, and for connecting the second positive terminal to the junction between the first inductive device and the first resistor and the second negative terminal to the junction between the second inductive device and second resistor whereby the direction of the current through the inductive devices will be determined by the sign of the voltage difference between the voltages of the first two of positive and negative terminals and the second two of positive and negative terminals.

12. In an electric system of control, in combination, saturable core reactor means having variable voltage input means the voltage input of which may be varied from a given positive value to a given negative value, said saturable core reactor means having output circuit means including a first positive terminal, a first negative terminal, a second positive terminal, and a second negative terminal, an electric load unit comprising a first inductive device, a first resistor, a second inductive device, and a second resistor all connected in a loop circuit in the order recited, circuit means for connecting the first positive terminal to the junction between the first inductive device and the second resistor and the first negative terminal to the junction between the first resistor and the second inductive device, and for connecting the second positive terminal to the junction between the first inductive device and the first resistor and the second negative terminal to the junction between the second inductive device and second resistor, said variable voltage input means including first coil means wound in one sense with reference to certain elements of the saturable core reactor means to produce an opposite voltage variation on the second positive and negative terminals.

13. In an electric system of control, in combination, saturable core reactor means having two output circuits each having a pair of output terminals, a variable voltage input circuit having coil means wound in one sense and other coil means wound in an opposite sense whereby a change in current flow in one sense through said coil means will cause the voltage across the first pair of output terminals to rise and the voltage across the other pair of terminals to decrease and a change in current flow in an opposite sense through said coil means will produce a reverse voltage change on said terminals, an inductive load having two inductive windings and two resistors, said resistors and windings being loop-connected with one another in alternate sequence, one winding and one resistor being connected in series with each other across one pair of terminals, and the said one resistor and other winding being connected in series with each other across said other pair of terminals.

WILLIAM F. EAMES.
WALTER H. ESSELMAN.

REFERENCES CITED

The following references are of record in the file of this patent:

UNITED STATES PATENTS

| Number | Name | Date |
|---|---|---|
| 2,519,339 | Avery | Aug. 22, 1950 |
| 2,519,370 | Herchenroeder | Aug. 22, 1950 |
| 2,519,379 | King | Aug. 22, 1950 |